Figure 1:
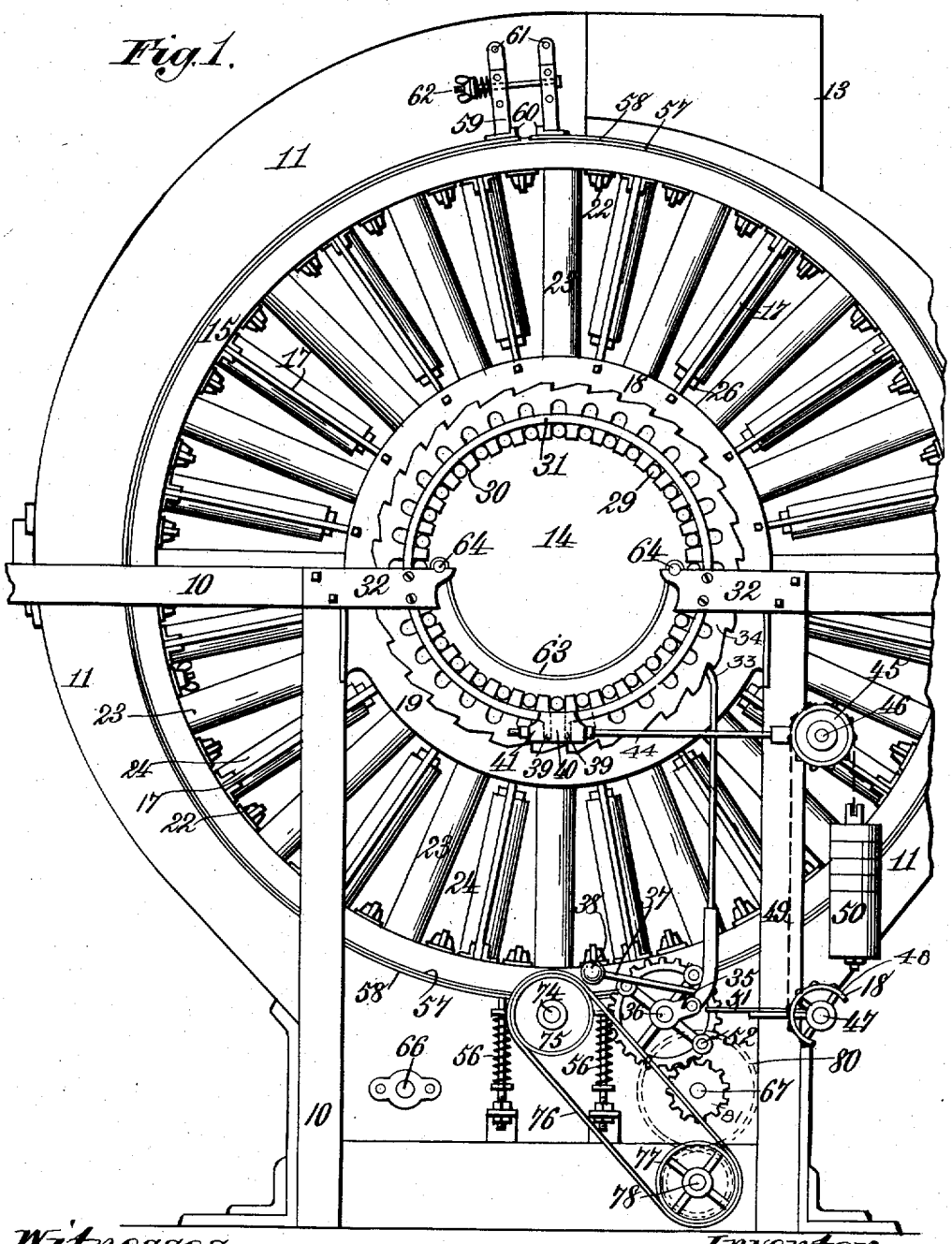

J. E. MITCHELL.

DUST COLLECTOR.

APPLICATION FILED AUG. 11, 1900.

Reissued Aug. 17, 1915.

13,963.

4 SHEETS—SHEET 1.

*Witnesses.*
Robt Everett,
J. B. Kreider

*Inventor*
John E. Mitchell,
By James L. Norris
Atty.

J. E. MITCHELL.

DUST COLLECTOR.

APPLICATION FILED AUG. 11, 1900.

Reissued Aug. 17, 1915.

13,963.

4 SHEETS—SHEET 2.

Witnesses,
Robt Everett,
J. B. Keefer

Inventor,
John E. Mitchell
By James L. Norris
Atty.

COLUMBIA PLANOGRAPH CO., WASHINGTON, D. C.

J. E. MITCHELL.

DUST COLLECTOR.

APPLICATION FILED AUG. 11, 1900.

Reissued Aug. 17, 1915.

13,963.

4 SHEETS—SHEET 3.

Witnesses.
Robert Everett,
J. B. Keefer

Inventor.
John E. Mitchell.
By James L. Norris
Atty.

COLUMBIA PLANOGRAPH CO., WASHINGTON, D. C.

J. E. MITCHELL.

DUST COLLECTOR.

APPLICATION FILED AUG. 11, 1900.

Reissued Aug. 17, 1915. 13,963.

4 SHEETS—SHEET 4.

Witnesses,
Robert Emmett,
H. B. Keefe

Inventor,
John E. Mitchell,
By James L. Norris,
Att'y.

COLUMBIA PLANOGRAPH CO., WASHINGTON, D. C

UNITED STATES PATENT OFFICE.

JOHN E. MITCHELL, OF ST. LOUIS, MISSOURI, ASSIGNOR TO THE PRINZ AND RAU MANUFACTURING COMPANY, A CORPORATION OF WISCONSIN.

DUST-COLLECTOR.

13,963. Specification of Reissued Letters Patent. Reissued Aug. 17, 1915.

Original No. 645,369, dated March 13, 1900, Serial No. 730,615. Application for reissue filed August 11, 1900. Serial No. 26,653.

*To all whom it may concern:*

Be it known that I, JOHN E. MITCHELL, a citizen of the United States, residing at St. Louis, in the State of Missouri, have invented new and useful Improvements in Dust-Collectors, of which the following is a specification.

This invention relates to dust-collectors, especially of the balloon type, and has for one of its objects to provide improved features of construction, whereby a large extent of air-filtering surface, or dust collecting medium, may be conveniently employed in a machine occupying comparatively small space.

It also has for its object to provide improved automatic mechanism for periodically cleaning a set or series of porous air-filtering tubes, or successive portions of a dust collecting medium, from accumulations of dust, whereby the same are collapsed and suddenly stretched so as to remove the dust adhering to their surfaces.

My invention has for a further object to provide an improved construction and arrangement of porous air-filtering and dust collecting tubes and an improved manner of mounting the same, whereby said tubes have the same diameter throughout their length, thus permitting the cloth or other porous material to be stretched uniformly, and also allowing said tubes to present perpendicular walls when brought into position over the cut-off chamber, so that the dust can be easily dislodged from the inner surfaces of the tubes without having to slide down any portion of the cloth surface.

It is another object of my invention to provide improved means for detachably securing the porous air-filtering tubes to their places in the machine, so that a set or series of these tubes can be easily and quickly removed in case it should become necessary to repair or replace any tube or set of tubes.

Furthermore, my invention has for another object to provide means for making a separation in the dust collected, whereby in collecting flour-dust, for instance, the best quality or heavy white dust will be kept separate from the atmospheric black dust of low specific gravity, and whereby in collecting dust from grain-cleaning machinery the porous air-filtering or dust collecting medium will be kept free from chaff, straw, coarse dust, and other matter that would tend to obstruct the free passage of air.

To accomplish the objects above named and for other purposes that may hereinafter appear, my invention consists in features of construction and novel combinations of devices in dust-collecting apparatus, as hereinafter described and claimed.

Figure 2:
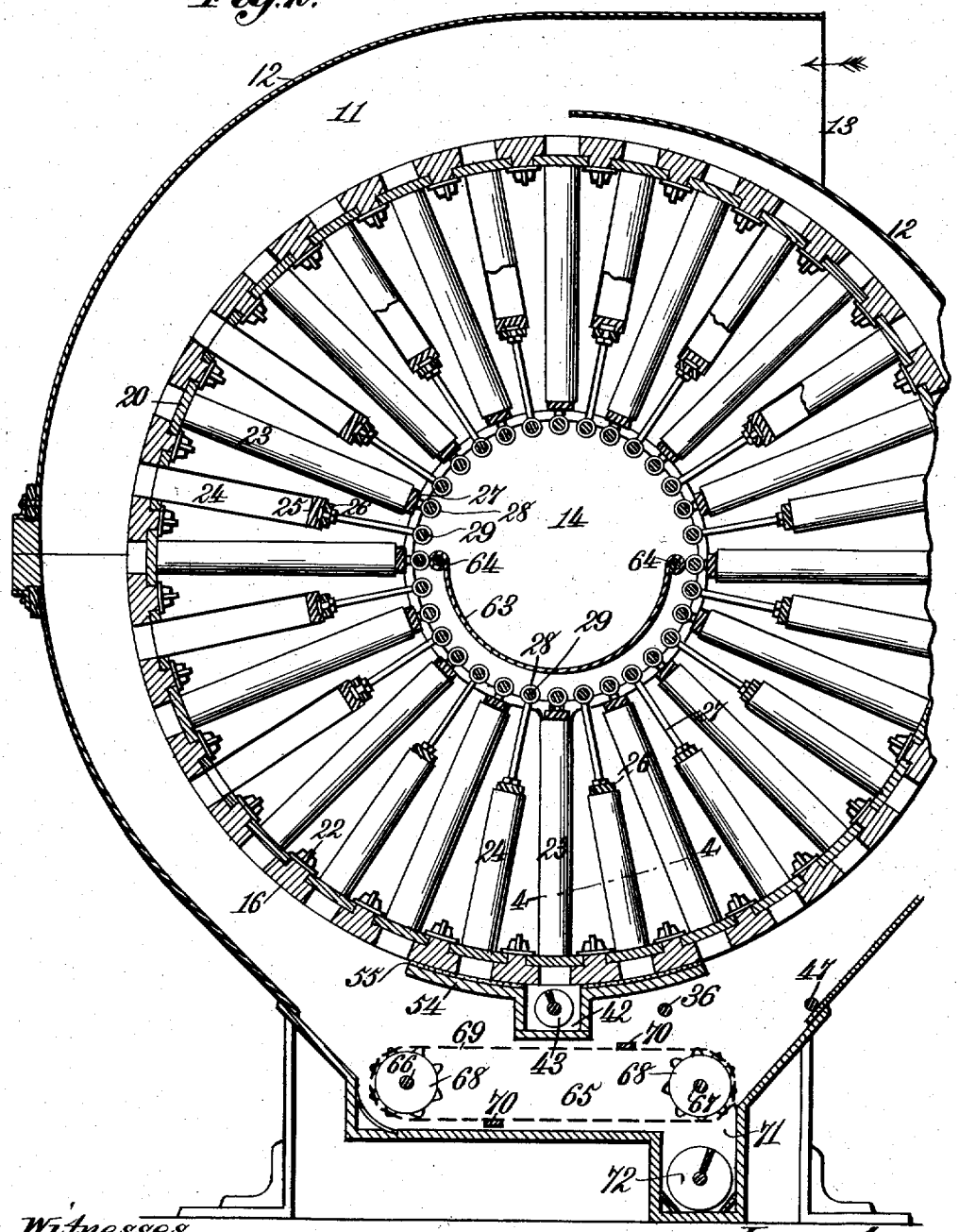
Figure 3:
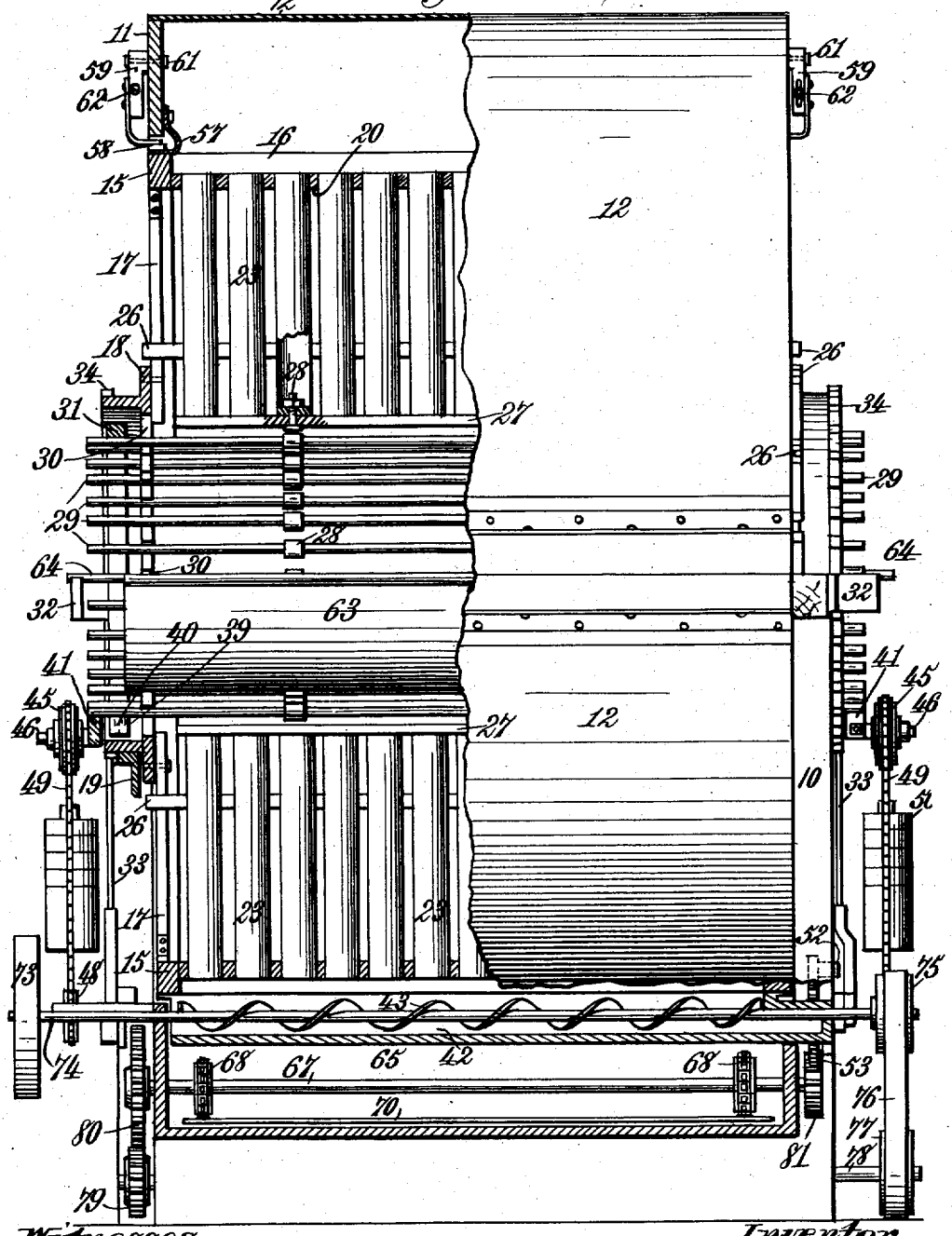
Figure 5:
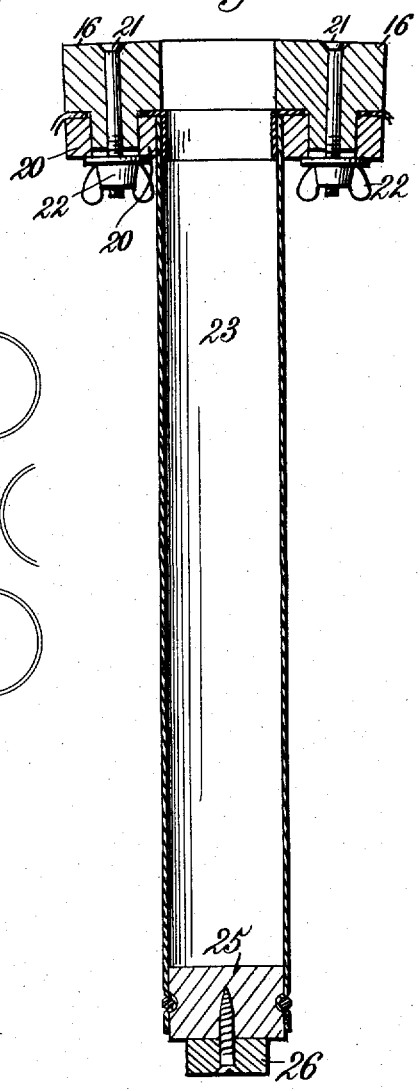
Figure 4:
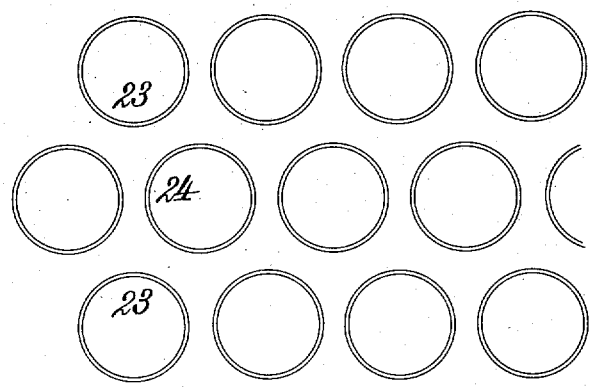

In the annexed drawings, illustrating the invention,—Figure 1 is an end elevation of my improved dust-collector. Fig. 2 is a vertical transverse section of the same. Fig. 3 is a part side elevation and a part vertical longitudinal section of the machine. Fig. 4 is a sectional detail view on the line 4—4 of Fig. 2. Fig. 5 is an enlarged sectional view of a porous air-filtering tube.

The machine comprises a suitable supporting framework 10 for the vertically-arranged ends or heads 11 of an outer sheet-iron casing 12, having a tangentially arranged dust and air inlet 13 in the upper part of one side. This casing, composed, preferably, of wooden heads 11 and sheet-iron body portion 12, may be made in two sections, upper and lower, as shown, the upper section being removable and resting on the lower section, which is in turn supported by the machine-frame. It will be observed that the casing or shell and its heads are so constructed or shaped as to present the form of a scroll around each of two large circular end openings 14, one of which is located in each head of the machine, thus forming a cyclone dust-collecting chamber.

In the circular openings 14 and extended lengthwise of the machine there is mounted a rotary reel or drum comprising two large circular rims 15, connected by bars or slats 16, said rims being also connected by radial arms 17 with central hubs or internal rings 18, that are mounted to rotate in bearings formed by semicircular castings 19, which are rigidly secured to the machine-frame. The reel bars or slats 16 are shouldered or rabbeted longitudinally along opposite edges, on the inner sides of said bars, to provide seats or recesses into which the opposite edges of longitudinally-extended boards 20 are fitted. These boards 20 are detachably secured in place by means of bolts 21 and thumb-nuts 22, said bolts being secured in the reel-bars 16 and extended to the inner sides of the same for attachment of thumb-nuts 22, that may be provided with washers or be made sufficiently large to lap onto the boards 20, and thereby hold them to their seats, a bolt and nut being provided at each end of the several reel-bars to be within easy access from the end of the machine.

Each of the boards 20 is provided with a series of circular perforations of the same diameter as the porous dust collecting and air-filtering tubes or pockets 23 and 24, that may be made from any suitable cloth. The outer end of each cloth tube is fitted into and secured in one of these perforations of a board 20, so that each tube will open into or communicate with the interior of the machine-casing outside the rotary reel in which the several cloth tubes are supported and carried. The inner ends of the cloth air-filtering tubes 23 and 24 are secured to and closed by circular wooden blocks or heads 25, a series of which are carried by a number of bars 26 and 27, extended longitudinally through the reel. Each bar 26 and 27 is supported by a number of eyebolts 28, engaging or carrying longitudinally-extended gas pipes or rods or distending bars 29, that are engaged at their outer end portions in radial open-ended slots or guides 30, formed in the reel-hubs 18, being supported in these slots by means of a stationary circular guideway or runway or track 31 at each end of the machine inside the reel-hubs, each guideway 31 being secured to and held by bracket-arms 32, that are supported by the machine-frame.

It will be seen that the porous dust collecting or air-filtering surfaces in the rotary reel comprise alternating series of long cloth tubes 23 and short cloth tubes 24, all radially arranged or suspended in the reel or drum, and that all these tubes are closed at their inner ends, while their outer ends are open to the atmosphere and in communication with the interior of the casing surrounding the reel. By reason of the inner ends of the several cloth tubes being closed the inner ends of the long tubes 23 can be set very close together, and at the same time a series of shorter tubes 24 can be placed, as shown, between adjacent rows or series of the longer tubes. This arrangement not only permits the employment of a very large extent of cloth surface in the air-filtering tubes, but is such also that the tubes can be made of the same diameter throughout their length. These tubes can therefore be cheaply manufactured, and as the cloth is cut straight with the warp the tubes will stretch uniformly and are much more easily cleaned than would be the case if they were made tapering or larger at one end than at the other. It will also be observed that the tubes in each alternate series 23 and 24 are so set in the reel that the tubes in each series will alternate with and dodge the tubes in adjoining series, thus allowing plenty of room around the inner ends of the short tubes, so that they cannot strike against the longer tubes. The bars 26, carrying the heads 25 of the shorter tubes, are notched at their ends, so as to fit loosely around the arms 17 in the ends of the reel, which will prevent these bars and attached inner ends of the short tubes from swinging against the alternating series of long tubes. It will be apparent that any series of cloth air-filtering tubes 23 or 24 can easily and quickly be removed through the central opening at either end of the machine by simply loosening the thumb-nuts 22 on the bolts 21 and removing the board 20, to which the outer ends of the tubes are secured, the rod 29, from which the inner ends of said tubes are supported, being easily disengaged from the slots 30 of the reel-hubs.

The rotation of the reel is effected intermittingly by means of pawls 33, engaging ratchets 34 on the reel-hubs. These pawls 33 are actuated from crank-arms 35 on a crank-shaft 36, mounted in the lower part of the machine-frame. Each pawl 33 may have attached thereto an arm 37, carrying a weight 38 to hold the pawl in engagement with the ratchet of one of the reel-hubs.

It will be observed that the stationary guideway 31 at each end of the machine describes a complete circle, except at the lowest point, where it terminates with depending lips 39 at the sides of an intervening space or vertical way 40, into which the rods 29 are adapted to fall when they are brought in succession to that point and are released by descent of knockers or hammers 41 at opposite ends of the machine. The open-ended slots 30 in the reel-hubs 18 at each end of the machine are arranged opposite the inner ends of each series of cloth tubes 23 and 24, and the rods 29, supporting the inner ends of said tubes, are adapted to fit loosely into said slots and rest against the inner surfaces of the stationary circular guideways 31, except at the opening or vertical way 40 in the lower part of each circular guideway, and at these points the ends of the rods 29 will normally rest on the hammers 41 in position to drop into the vertical ways or drop 40 when said hammers descend. When the reel is rotated or revolved step by step, the slots 30 carry the rods 29 around, while the stationary guideways, runways or tracks 31 hold these rods 29, so as to keep the cloth tubes 23 and 24 stretched or distended to their full length, except at the lowermost rod 29, which is always free to work up and down in the spaces or ways 40 as engaged or released by the hammers 41, to knock the dust from the connected lowermost series or row of cloth tubes. The guide-ways, run-ways or tracks, as will be seen, support the bars 29 in distending position when traveling below the axis of the drum.

The number of teeth in each reel-hub ratchet 34 corresponds with the series of air-filtering tubes 23 and 24, so that each revolution of the crank-shaft 36 causes the pawls 33 to bring a series of these tubes over a draft cutting off device or cut-off air-chamber 42 from which the air is shut off and which contains a conveyer 43 to carry away the dust as it is dislodged from the air-filtering tubes. While a series of the tubes 23 or 24 are at rest directly over the cut-off chamber 42, the hammers 41 at each end of the machine simultaneously strike the rod 29, supporting said series of tubes, a blow or series of blows, whereby the dust accumulated in said series of tubes is dislodged and caused to drop into the conveyer in the cut-off chamber. The hammers 41 are mounted on arms 44, that are secured to and adapted to move with sprocket-wheels 45, loosely mounted on spindles 46, that are secured to the frame 10 at opposite ends of the machine. Directly underneath the sprocket-wheels 45 and mounted in bearings on the frame 10 is a shaft 47, extended inside the machine-casing throughout the entire length of the machine. To the ends of this shaft 47 are secured sprockets 48, which are connected with the sprocket-wheels 45 by chains 49, each of which is secured at one end to a lower sprocket 48, while its other end is carried over the upper sprocket 45, as shown, and has a weight 50 suspended therefrom. To one end of the shaft 47 is secured an arm 51, which is extended in a direction to be engaged periodically by roller-trips 52, that are loosely mounted on pins or spindles carried by a gear-wheel 53, mounted on the crank-shaft 36 at one end of the machine. When the arm 51 is engaged by a roller-trip 52, the shaft 47 will be caused to partially turn or rotate, thereby lifting the weights 50, through the sprocket-and-chain connections at the two ends of the machine. At the same time the movements of the sprocket-wheels 45 in lifting the weights 50 will cause the hammers 41 to fall down or away from the rod 29 a considerable distance. When the arm 51 is released by the passing of one of the roller-trips 52, the weights 50 will instantly fall, and thereby positively force the hammers 41 to fly back with great velocity and strike the lowermost rod 29, that has meanwhile dropped into the vertical ways 40, between the depending lips 39 of the guideways 31 at the two ends of the machine. Each time the hammers 41 are lowered the rod 29, connecting with the series of air-filtering tubes directly over the cut-off chamber, will drop down through the vertical ways 40, thereby collapsing all the cloth tubes that connect with said rod. Now when the hammers 41 fly back and strike this rod 29 the tubes that connect therewith are stretched so quickly and uniformly that the dust adhering to the inner surfaces of said tubes will be completely dislodged and fall down into the cut-off chamber 42, from which it will be discharged by the conveyer 43, mounted in said chamber. While the reel is being rotated by the pawls 33, the hammers 41 remain in contact with and thereby support the rods 29 successively, which enables the rod that has just been struck or jarred to again catch the circular guideways 31, and thus prevents any liability to locking the intermittingly revoluble drum, reel or balloon frame.

The cut-off chamber 42 is extended lengthwise under the lowermost portion of the reel and in direct contact therewith. On its opposite sides at the top this cut-off chamber is provided with concavo-convex shields 54, the concaved upper sides of which are provided with a packing 55, of soft material, adapted to press against the outer surfaces of the reel-slats 16, so as to effectually exclude the air from the series of cloth tubes that are directly over the cut-off chamber. For the purpose of further insuring a close air-tight joint between the cut-off chamber and the periphery of the rotary reel said cut-off chamber may be pressed upward against the reel by means of adjustably-mounted springs 56, as shown.

Between the reel-rims 15 and the heads of the machine-casing there is placed a suitable packing 57, that is secured to the casing-heads in any suitable manner and held in place against the periphery of each reel-rim 15 by means of light steel bands 58, that are extended around each rim at its circumference. Each steel band 58 is held in place by adjustable arms 59, engaging lugs 60 on the ends of the band, said arms 59 being connected with the casing-heads 11 by pivots 61 and a spring clamping-bolt 62 being provided to draw said arms together for tightening the steel band against the packing. The object of the packing 57 and adjustable steel bands 58 is to make a reliable air-tight joint between the rotating reel and its stationary casing.

In the central opening of the machine surrounded by the reel there is a dust-pan 63, that may be made of sheet metal. This pan may be supported by rods 64 on its opposite sides, resting on the bracket-arms 32 of the machine-frame. The object of this pan 63 is to provide means for catching the dust that may accumulate on the woodwork of the reel between the cloth tubes 23 and 24, it being obvious that should enough dust accumulate to give it weight it will drop off into this pan, whence it can be easily removed when desired.

Below the reel and the cut-off chamber there is a settling-chamber 65, located in the bottom portion of the machine-casing. In this chamber 65 are located longitudinally-extended shafts 66 and 67, carrying sprocket-wheels 68, on which are mounted chains 69, by which a number of drag bars or sweeps 70 are supported. These drag-bars 70 are arranged to operate in such manner as to push or sweep the dust from the settling-chamber 65 and deposit it into a conveyer-box 71, whence it is discharged from the machine by means of a conveyer 72, mounted in said box.

The various moving parts of the machine may be actuated by means of power applied to a band-wheel 73 on one end of the shaft 74 of the conveyer 43 in the cut-off chamber. The other end of this shaft 74 carries a pulley 75, connected by belting 76 to a pulley 77 on one end of the shaft 78 of the conveyer 72, and the other end of this shaft 78 carries a spur-gear 79, meshing with and driving a spur-gear 80 on the shaft 67, through which is actuated the sprocket mechanism, by which the drag bars or sweeps 70 are carried. This shaft 67 carries on one end a spur-gear 81, meshing with and driving the gear 53, that carries the trip-rolls 52 for controlling the weighted sprocket mechanism through which the hammers or knockers 41 are operated at proper intervals, said gear 53 being mounted on and actuating also the crank-shaft 36, with which are connected the pawls 33 for imparting a step-by-step rotation to the balloon frame or reel in which the cloth tubes 23 and 24 are carried.

In operating this dust collecting and separating apparatus, the dust-laden air is blown by any suitable fan (not shown) into the outside casing of the collector at the tangentially arranged inlet 13, and as soon as the air enters the machine it expands and partially loses control of the dust. The dust particles are traveling at great speed upon entering the machine, and by reason of the dust laden air being introduced tangentially into the scroll-shaped casing a large percentage of the dust is caused to follow the eccentrically-curved or scroll-formed wall of the outer casing, and will thus pass rapidly around the space outside the reel and be deposited in the settling-chamber 65 below the reel and cut-off chamber. From this chamber 65 in the bottom of the machine-casing the heavy-dust settlings will be removed by the sweeps or drag-bars 70 and deposited in the conveyer-box 71 and conveyer 72, whereby heavy dust is discharged from the machine, as before described. A very large percentage of heavy dust is collected in this way, ordinarily something like ninety per cent.; but the light dust, including atmospheric and smoke dust of low specific gravity, is carried by the air and deposited upon the inner surfaces of the porous air-filtering tubes 23 and 24, that are mounted in the reel, the purified air passing through the walls of said tubes and discharging from each open end of the machine. Thus in collecting flour-dust, for instance, the black dust, of comparatively-low specific gravity, is kept separate from the heavier white dust collected by the outside casing and which is of a purer quality and much brighter color. Another advantage of this apparatus is that in collecting dust from grain-cleaning machinery the straw, chaff, white-caps, and other refuse matters are collected by the outside casing and are prevented from entering the porous air-filtering tubes. If such material should enter the cloth tubes, a large percentage of the chaff would stick to the cloth surfaces and could not easily be removed, which would result in the cloth soon becoming clogged, so as to obstruct the free passage of air. Furthermore, as the light dust and the heavy or coarse dust are separately collected, by the means above described, the porous air filtering or dust collecting medium is preserved from injury by the coarse dust and will, consequently, last much longer than heretofore.

It is not new to employ an expansion or settling chamber constituting a gravity action preliminary collector to settle a part of the dust before the air is filtered, but I believe the combination machine, as herein shown, to be new, in which an intermittently rotatable dust collecting medium of the construction described is incased in a circular or scroll-shaped casing for the purpose set forth. The chief advantage of such a machine is that in collecting flour dust the black atmospheric dust is kept separate from the white dust so that the dust collected by the outside casing is of a purer quality and much brighter color.

There are two types of dust collectors in general use at present, one of which is known as the centrifugal or cyclone principle, which is practically the same as the outside casing of this machine, without any filtering device in connection therewith. The other type is a filtering machine alone, in which all of the dust laden air is blown directly into cloth tubes, balloons or bags. Each type of machine mentioned has its advantages, the centrifugal or cyclone machine will collect only the best quality of dust allowing the light weight and black atmospheric dust to discharge with the air. This last feature is objectionable, but the flour dust that is collected by a centrifugal or cyclone machine is of good quality and bright color. On the other hand, the machines depending upon filtering surface alone for collecting the dust, have the advantage over the centrifugal machine in collecting practically all the dust, but when such a collector is used for collecting flour dust, the entire dust collected is usually discolored to such an extent that it is hardly fit to be used or worked into flour again, which in most cases means a great waste.

By cyclone chamber I mean a circular inclosure with a substantially tangential inlet, an air outlet and a discharge for precipitated dust.

The principal object of my invention is to overcome the defects of each type of machine above mentioned and to combine the advantages of the two principles, viz.; the centrifugal and the filtering and to employ certain novel and practical means for thoroughly cleaning the filtering tubes at intervals; and, as a whole, to construct a simple and compact machine that is thoroughly automatic in operation and so arranged that easy access can be had to each and every part.

I am not aware of any dust-collecting apparatus in which the various parts are constructed, arranged, and combined for thoroughly effective and economical operation in the manner herein described.

It will be observed that the space between the periphery of the drum or balloon and the inner circumferential face of the casing for the flow of dust laden air gradually diminishes from approximately the inlet for the air to the settling chamber, and from said chamber gradually diminishes toward the terminal of the space. The effect is that as the volume of air in its circuit around the balloon gradually lessens owing to the escape of a portion of it through the filtering tubes the onflowing reduced volume of air passes through a gradually diminishing space, and thus the centrifugal impetus given to the air in its travel around the balloon is maintained throughout its circuit to such a material extent that the reduction in volume of air caused by escape through the tube does not weaken the force of the onflowing current to such an extent that there might be liability of the heavier and purer quality of flour dust being drawn into the tubes with the lighter and less pure particles, or liability of straw, chaff or other refuse matter in grain cleaning machinery being drawn into the tubes. Furthermore such feature of construction materially lessens the liability of back currents or eddies being formed which would have a tendency to impair the highest efficiency of the machine.

It will also be observed that the separate collections are removed from the settling chamber of the casing and from the cut-off chamber of the balloon without one mixing with the other and without opening communication from the outside with either. By removing the deposits from the settling chamber without opening said chamber the circuit of centrifugally impelled air is maintained unbroken around the balloon, and any back currents arising from opening communication with the settling chamber and which would affect not only the centrifugally impelled air circuit but also the escape of air through the filtering tubes and interfere with the proper separation of the different grades of material is avoided. This delivery of the separate deposits without mixing them and without interruption to the proper working of the machine is effected by the separate conveyers for each, the balloon cut-off chamber and the settling chamber.

What I claim as my invention is—

1. In a dust-collector, the combination of a scroll-shaped casing composed of upper and lower sections and having an air-inlet in one side of the upper section, a rotary reel mounted in said casing, alternating series of radially-arranged long and short air-filtering tubes carried in said reel, the inner end of each of said tubes being closed and its outer end open and in communication with the interior of the surrounding casing, mechanism for rotating said reel intermittingly, knocker mechanism for jarring each series of air-filtering tubes in succession when in its lowermost position, a cut-off chamber in air-tight contact with the lowermost portion of the reel, a conveyer in said cut-off chamber, a settling-chamber below the cut-off chamber, and conveyer mechanism in said settling-chamber, whereby the comparatively-light dust and the heavy dust are separately collected, substantially as described.

2. In a dust-collector, the combination of a casing having an inlet for dust-laden air and in its lower portion a settling chamber for heavier particles of dust, a rotatable reel provided with a dust-collecting medium and mounted in and surrounded by the casing to form an uninterrupted dust-laden air circuit around the reel and across the settling chamber, a cut-off chamber in contact with a portion of the dust collecting reel to receive light particles of dust from such portion of the reel, means in the cut-off chamber to remove the light dust deposited therein, and means in the settling chamber of the casing for removing the heavier dust deposited in the chamber without breaking the circuit of the dust-laden air in the conduit around the reel and through the dust-collecting medium, said casing being so proportioned and located with respect to the reel as to maintain a continuous travel in one direction of the dust-laden air in a circular path around substantially the entire circumference of the reel, substantially as described.

3. In a dust-collector, the combination of a scroll-shaped casing composed of upper and lower sections and having an air-inlet in one side of the upper section, said casing being provided with heads having enlarged circular openings therein, a frame supporting the lower section of said casing, a rotary reel mounted in the circular openings of the casing-heads, adjustable packing secured in said openings around the rims of the reel, a series of radially-arranged air-filtering tubes carried in said reel, the inner end of each of said tubes being closed and its outer end open and in communication with the interior of the surrounding casing, mechanism for rotating said reel intermittingly, knocker mechanism for jarring each series of air-filtering tubes in succession, a cut-off chamber having shields provided with packing in close air-tight contact with a portion of the reel periphery, a conveyer in said cut-off chamber, a settling-chamber below the reel and cut-off chamber, and conveyer mechanism in said settling-chamber, said settling chamber and cut-off chamber together with their respective conveyers constituting means for the separate collection of the comparatively light dust and the heavier dust and the removal of the separate collections without opening communication with either of said chambers, substantially as described.

4. In a dust-collector, the combination with an outer casing provided with an inlet for dust-laden air, of a rotary reel mounted in said casing and comprising detachable radially-arranged long and short air-filtering tubes disposed in alternating-series, all of said tubes being of the same diameter throughout their entire length and so set in the reel that the tubes in each series will alternate with and dodge the tubes in adjoining series, whereby said long and short air-filtering tubes may be placed closely together without contact with each other, each of said tubes having its inner end closed and its outer end open and in communication with the interior of the surrounding casing, mechanism for rotating said reel intermittently, a cut-off chamber in close air-tight contact with a lower portion of the reel periphery, and means for automatically collapsing and stretching each series of air-filtering tubes in succession while in perpendicular position over the cut-off chamber, the dust being thereby dislodged from the perpendicular walls of said air-filtering tubes without having to slide over an inclined surface, substantially as described.

5. In a dust-collector, the combination with an outer casing having in one side of its upper part an inlet for dust-laden air, of a rotary reel mounted in said casing and comprising long and short radially-arranged porous air-filtering tubes that are all of the same diameter throughout their entire length, said long and short tubes being disposed in alternating series and the tubes in each series being so set in the reel as to alternate with and dodge the tubes in adjoining series to permit said tubes being placed closely together without contact with each other, each of said tubes having its inner end closed and its outer end open and in communication with the interior of the surrounding casing, mechanism for rotating the reel intermittently, a cut-off chamber in close air-tight contact with a lower portion of the reel periphery, a conveyer in said chamber, and means for automatically collapsing and stretching the perpendicular walls of each series of said long and short tubes in succession while in perpendicular position over the cut-off chamber so that the dust will be dislodged from the walls of said air-filtering tubes without having to slide over an inclined surface, substantially as described.

6. In a dust-collector, the combination with an outer casing, of a rotary reel mounted in said casing and provided with outer circular rims and radially-slotted hubs or internal rings connected with said rims by radial arms, said outer rims being connected with each other by longitudinally-extended slats, detachable boards seated longitudinally between said slats and each provided with a series of circular openings, a series of radially-arranged air-filtering tubes having outer open ends secured in said openings of the boards and communicating with the interior of the surrounding casing, heads closing the inner ends of said air-filtering tubes, longitudinally-extended bars to which said heads are secured, a series of longitudinally-extended rods engaged in the radial slots of the reel hubs, eyebolts connecting said rods and bars, stationary circular guides for said rods, mechanism for rotating the reel intermittingly, knocker mechanism to strike in succession each supporting-rod of a series of said tubes to dislodge dust therefrom, a cut-off chamber, and a conveyer in said chamber, substantially as described.

7. In a dust-collector, the combination with an outer casing, of a rotary reel mounted in said casing and provided with outer circular rims and radially-slotted hubs or internal rings connected with said rims by radial arms, said outer rims being connected with each other by longitudinally rabbeted or recessed slats, detachable boards seated longitudinally in the rabbeted portions of said slats and each provided with a series of circular openings, alternating series of radially-arranged long and short air-filtering tubes having open outer ends secured in the openings of said boards and communicating with the interior of the surrounding casing, heads closing the inner ends of said air-filtering tubes, longitudinally-extended bars to which said heads are secured, a series of longitudinally-arranged rods connected with said bars and engaged in the radial slots of the reel-hubs, stationary circular guides for said rods, the bars that carry the heads of the short air-filtering tubes being notched to engage the radial arms in the ends of the reel, mechanism for rotating the reel intermittingly, knocker mechanism to strike in succession each supporting-rod of a series of said tubes to dislodge dust therefrom, a cut-off chamber, and a conveyer in said chamber substantially as described.

8. In a dust-collector, the combination with an outer casing, of a rotary reel mounted in said casing, a series of radially-arranged air-filtering tubes carried in said reel and having inner closed ends and outer open ends in communication with the interior of the casing surrounding the reel, boards detachably mounted in the periphery of the reel and provided with series of circular openings in which the open outer ends of the air-filtering tubes are secured, thumb-nuts and bolts for detachably securing said boards, a series of longitudinally-arranged rods connected with the closed inner ends of the air-filtering tubes and loosely engaged with the hubs of the reel, knocker mechanism to strike in succession each of said rods, guideways for said rods, means for rotating the reel intermittingly, and a cut-off chamber, substantially as described.

9. In a dust-collector, the combination of an outer casing, a rotary reel mounted in said casing and provided with radially-slotted hubs, a series of radially-arranged air-filtering tubes carried by said reel and having inner closed ends and outer open ends in communication with the interior of the casing surrounding the reel, a series of longitudinally-arranged rods connected with the closed inner ends of the air-filtering tubes and loosely engaged in the radial slots of the reel-hubs, guideways for said rods, hammers or knockers to alternately engage and release each of said rods and strike forcibly against each rod in succession, supporting arms for said hammers, weighted sprocket mechanism by which said hammer-arms are carried, an arm projecting from said sprocket mechanism, roller-trips to act on said arm, and a gear carrying said roller-trips, substantially as described.

10. In a dust-collector, the combination of a casing having circular openings in its ends and an air-inlet in the upper part of one side, a rotary reel comprising outer rims mounted in said circular openings of the casing, and having internal rings connected with said rims by radial arms, packing between said reel-rims and the casing, a series of radially-arranged long and short air-filtering tubes carried in the reel and each provided with a closed inner end and an open outer end in communication with the interior of the surrounding casing, said long and short series of air-filtering tubes being alternated with each other to secure compactness of structure, a dust-pan removably supported in the center of the reel, a cut-off chamber in close contact with a lower peripheral portion of the reel, packing between said chamber and reel, a conveyer in said cut-off chamber, a settling-chamber in the lower part of the outer casing, and means for removing settlings from said chamber, substantially as described.

11. In a dust collector, the combination of an outer casing having an air-inlet in the upper part of one side, a rotary reel mounted in said casing, a series of radially-arranged straight and porous air-filtering tubes detachably mounted in said reel, mechanism for rotating the reel intermittingly, knocker mechanism for automatically collapsing and stretching each series of air-filtering tubes in succession, a cut-off chamber, a settling-chamber in the lower part of the casing, means for removing deposits from the cut-off chamber and from the settling-chamber, whereby the comparatively-light dust and the heavier dust are separately collected, and a dust-pan in the center of the reel, substantially as described.

12. A dust collector of the balloon-type, consisting of a revoluble balloon frame, rows of porous dust collecting tubes radially arranged in said frame and open at one end, an air circulating chamber with which said tubes are in communication extending around the outer ends of said dust collecting tubes, said chamber having a tangential inlet and gradually diminishing in area downwardly on one side of the balloon and upward on the other side, and an expansion settling chamber in the circuit of said air circulating chamber, substantially as described.

13. A dust collector of the balloon-type, consisting of a revoluble balloon frame, rows of porous dust collecting tubes radially arranged in said frame and open at one end, an air circulating chamber with which said tubes are in communication extending around the outer ends of said dust collecting tubes, said chamber having a tangential inlet and gradually diminishing in area downward on one side of the balloon and upward on the other side and at its smallest area in communication with the larger area adjacent to the inlet, and an expansion settling chamber in the circuit of said air circulating chamber, whereby the dust laden air is caused to travel in a cyclone circuit and as the air volume is reduced by air escaping through the tubes the circularly impelled air passes through a gradually reduced space to the end of its circuit except at the point of location of the expansion chamber, and is caused to intersect the inflowing dust laden air near its inlet and prevent back-flow at such point, substantially as described.

14. A dust collector of the balloon type, consisting of a revoluble balloon frame, rows of porous dust collecting tubes radially arranged in said frame and open at one end, an air circulating chamber with which said tubes are in communication extending around the outer end of said dust collecting tubes, said chamber gradually diminishing in area on opposite sides of the balloon, an expansion settling chamber in the circuit of said air circulating chamber, a cut-off chamber for a portion of the balloon tubes, and conveyers for separately removing the separate collections deposited respectively in the cut-off chamber of the balloon and the settling chamber of the air circulating chamber, substantially as described.

15. A dust collector of the balloon type, consisting of a revoluble balloon frame, rows of porous dust collecting tubes radially arranged in said frame and open at one end, a casing surrounding the balloon frame to form an air circulating chamber with which said tubes are in communication extending around the outer ends of said tubes to form a continuous air circuit, said casing being so proportioned and located with respect to the dust collecting tubes as to maintain a continuous travel in one direction of the dust-laden air in a circular path around substantially the entire circumference defined by the outer ends of the tubes, a settling chamber in communication with said air circulating chamber from both sides of the balloon, a cut-off chamber for a portion of the balloon tubes, and conveyers for separately removing the separate collections deposited respectively in the cut-off chamber of the balloon and the settling chamber of the air circulating chamber, without opening atmospheric communication with either chamber, substantially as described.

In testimony whereof, I have hereunto set my hand this 20th day of July 1900.

JOHN E. MITCHELL.

Witnesses:
ED. BUETELLE,
H. V. LASHORN.

Copies of this patent may be obtained for five cents each, by addressing the "Commissioner of Patents, Washington, D. C."